United States Patent
Aizawa

(10) Patent No.: US 10,521,917 B2
(45) Date of Patent: Dec. 31, 2019

(54) IMAGE PROCESSING APPARATUS AND IMAGE PROCESSING METHOD FOR OBJECT TRACKING

(71) Applicant: OMRON Corporation, Kyoto-shi, Kyoto (JP)

(72) Inventor: Tomoyoshi Aizawa, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/756,106

(22) PCT Filed: Feb. 28, 2017

(86) PCT No.: PCT/JP2017/007731
§ 371 (c)(1),
(2) Date: Feb. 28, 2018

(87) PCT Pub. No.: WO2018/020722
PCT Pub. Date: Feb. 1, 2018

(65) Prior Publication Data
US 2019/0139231 A1 May 9, 2019

(30) Foreign Application Priority Data
Jul. 29, 2016 (JP) .................................. 2016-149732

(51) Int. Cl.
G06T 7/246 (2017.01)
G06K 9/00 (2006.01)
G06K 9/62 (2006.01)

(52) U.S. Cl.
CPC .......... G06T 7/248 (2017.01); G06K 9/00791 (2013.01); G06K 9/6202 (2013.01);
(Continued)

(58) Field of Classification Search
CPC .............. G06K 9/00791; G06K 9/6202; G06T 2207/20021; G06T 2207/30248; G06T 7/00; G06T 7/20; G06T 7/248
See application file for complete search history.

(56) References Cited

U.S. PATENT DOCUMENTS

| | | | |
|---|---|---|---|
| 6,687,386 B1 | 2/2004 | Ito et al. | |
| 2003/0168317 A1* | 9/2003 | Fromme | ................ B65G 43/02 198/502.1 |

(Continued)

FOREIGN PATENT DOCUMENTS

| | | |
|---|---|---|
| JP | H11-266450 A | 9/1999 |
| JP | 2001-60263 A | 3/2001 |

(Continued)

OTHER PUBLICATIONS

An English translation of the International Search Report of PCT/JP2017/007731 dated May 9, 2017.

(Continued)

*Primary Examiner* — Nirav G Patel
(74) *Attorney, Agent, or Firm* — Metrolex IP Law Group, PLLC

(57) ABSTRACT

Tracking a target object to be tracked included in a plurality of consecutively captured images is performed by an image processing apparatus. The image processing apparatus comprises an image acquisition unit and a tracking unit. The image tracking unit is configured to acquire an image. The tracking unit is configured to detect a target object to be tracked included in the image by matching and acquire over a plurality of the images an amount of movement of the target object to be tracked and a direction of the movement of the target object to be tracked. The tracking unit performs first matching by using a first template corresponding to the target object to be tracked, and performs second matching by using a second template, which is different in size or shape (Continued)

from the first template, in a case where a score of a result of the first matching is lower than a first threshold value.

11 Claims, 9 Drawing Sheets

(52) U.S. Cl.
CPC ............... *G06T 2207/20021* (2013.01); *G06T 2207/30248* (2013.01)

(56) References Cited

U.S. PATENT DOCUMENTS

2007/0127779 A1*  6/2007  Miyahara .................. G01C 3/08
                                                            382/106
2010/0165113 A1*  7/2010  Abe ...................... G06K 9/6203
                                                            348/169
2012/0020518 A1   1/2012  Taguchi
2013/0329948 A1  12/2013  Minagawa et al.

FOREIGN PATENT DOCUMENTS

| JP | 2001-60269 A | 3/2001 |
| JP | 2006-276948 A | 10/2006 |
| JP | 2009-87316 A | 4/2009 |
| JP | 2013-255062 A | 12/2013 |
| JP | 2014-92935 A | 5/2014 |
| WO | 2010-098024 A1 | 9/2010 |

OTHER PUBLICATIONS

An English translation of the Written Opinion of PCT/JP2017/007731 dated May 9, 2017.

* cited by examiner

IMAGE PROCESSING APPARATUS AND IMAGE PROCESSING METHOD FOR OBJECT TRACKING

TECHNICAL FIELD

The present invention relates to a technique for tracking an object included in consecutive frames.

BACKGROUND ART

In a monitoring system or the like, there is known a technique for detecting an object included in an image and automatically tracking the movement of the object. The tracking of the object can be implemented by, e.g., acquiring a difference between an image that does not include a target object to be tracked and an image that includes the target object to be tracked to generate a template, and searching the image frame by frame by using the template (PTL 1).

As a system to which the tracking of the object is applied, a traffic flow measurement system is known. It is possible to count the number of vehicles having passed a target point by shooting a video of a road by using, e.g., a camera installed on the roadside and tracking passing vehicles (PTL 2).

CITATION LIST

Patent Literature

[PTL 1] Japanese Patent Application Publication No. 2001-060269
[PTL 2] Japanese Patent Application Publication No. 2009-087316
[PTL 3] Japanese Patent Application Publication No. 2013-255062

SUMMARY OF INVENTION

Technical Problem

In the case where the vehicle passing on the road is tracked based on the image (video) of the road, a problem arises in that, when the sight of the vehicle on the image changes significantly, the vehicle cannot be tracked. For example, in the case where the vehicle has turned right or left on the road, or has turned around, the orientation of the vehicle changes, and hence pattern matching sometimes results in failure. In addition, in the case where the vehicle is tracked by using an image captured by a camera capable of attitude control such as a monitoring camera, the sight (size or the like) of the vehicle changes in response to change of the attitude of the camera (pan, tilt, zoom or the like), and hence pattern matching sometimes results in failure similarly.

Thus, a problem arises in that, when the size or sight of the target vehicle to be tracked changes on the image, accuracy in pattern matching is reduced.

On the other hand, a subject tracking apparatus described in PTL 3 is characterized in that the subject tracking apparatus copes with the change of the sight of a subject by determining the movement of the subject based on the degree of blurring of the subject.

However, in the case where the vehicle on the road is tracked, a distance between the camera and the vehicle is long, and hence it is difficult to grasp the change of the blurring. That is, it is difficult to apply the above technique to the tracking of the vehicle.

The present invention has been made in view of the above problem, and an object thereof is to improve accuracy in tracking in the case where the sight of a target object to be tracked changes in an image processing apparatus for tracking an object.

Solution to Problem

The present invention in its one aspect provides an image processing apparatus for tracking a target object to be tracked included in a plurality of consecutively captured images, the image processing apparatus comprising an image acquisition unit configured to acquire an image; and a tracking unit configured to detect a target object to be tracked included in the image by matching and acquire over a plurality of the images an amount of movement of the target object to be tracked and a direction of the movement of the target object to be tracked, wherein the tracking unit performs first matching by using a first template corresponding to the target object to be tracked, and performs second matching by using a second template, which is different in size or shape from the first template, in a case where a score of a result of the first matching is lower than a first threshold value.

The image processing apparatus according to the present invention is the apparatus for tracking the movement of the target object to be tracked between a plurality of frames. Note that the movement denotes movement on the image, and the movement can occur due to the movement of the target object to be tracked and the change of shooting conditions (pan, tilt, and zoom of a camera).

The tracking unit is the unit configured to detect the target object to be tracked from the image by matching and acquire the movement of the target object to be tracked (the direction and amount of the movement between frames) based on the detection result.

The detection of the target object to be tracked is performed by using the template. As the template, a feature amount may be used, and an image or the like may also be used. For example, in the case where a vehicle is tracked, the feature amount of each vehicle type (e.g., a passenger car, a truck, a bus, or a motorcycle) may be used and, in the case where the result of previous tracking is present, the image cut out based on the tracking result may be used. As a result, it is possible to obtain coordinates or an area corresponding to the target object to be tracked.

In addition, the tracking unit tracks the target object to be tracked included in the acquired image over a plurality of consecutively acquired frames. For example, the tracking unit acquires the change of the position of the detected target object to be tracked, and acquires the movement on a per target object to be tracked basis.

In the present invention, the tracking unit performs the first matching by using the first template first. The first template may be a pre-stored template or, in the case where the result of the tracking of the target object to be tracked in an image prior to the previous frame is present, the first template may be a template obtained by cutting out the target object to be tracked from the image. Note that, as described above, the template may be the feature amount or the image or the like.

In the case where matching is performed by using the template, a problem arises in that it becomes difficult to hit the target object to be tracked when the sight of the target object to be tracked significantly changes between frames. For example, in the case where the camera is zoomed or the case where the traveling direction of the target object to be tracked changes, an area corresponding to the template does not coincide with an area in which the target object to be tracked is actually present and, as a result, matching may result in failure or a matching score may be reduced.

To cope with this, in the present invention, the score (likelihood of matching) of the result of the first matching is acquired and, in the case where the score is lower than the first threshold value, matching is performed again by using the second template different in size or shape from the first template.

The second template may be a template obtained by enlarging or reducing the first template, or may also be a template obtained by deforming the first template after changing an aspect ratio. In addition, the second template is not necessarily a template obtained by deforming the first template, and may also be a newly acquired template. For example, in the case where the result of the detection of the target object to be tracked in the frame prior to the target image to be processed is present, the second template may be a template that is newly acquired based on the result.

According to the configuration described above, even in the case where the sight of the target object to be tracked changes on the image, it becomes possible to cope with the change.

Also, the tracking unit may estimate a change of a traveling direction of the target object to be tracked, based on a result of the detection of the target object to be tracked, and may perform the second matching by using the second template corresponding to the traveling direction after the change.

When the traveling direction of the target object to be tracked changes, there are cases where the sight on the image significantly changes such as the case where the front of the vehicle is changed to the side thereof. In addition, in the case where an intersection is present in the image, when the movement direction of the target object to be tracked (vehicle) changes, it can be presumed that the orientation of the vehicle has changed (e.g., the vehicle has turned right or left). In such a case, the second matching may be performed by using a template (e.g., a feature amount or a template image) corresponding to the orientation after the change. According to the configuration described above, it is possible to further improve accuracy in tracking.

Also, the tracking unit may determine whether or not tracking of the target object to be tracked is ended based on both of a score of a result of the second matching and an intensity of an edge in an area that is determined as a result of the matching.

Also, the tracking unit may end the tracking of the target object to be tracked in a case where the score of the result of the second matching is lower than a second threshold value and the intensity of the edge in the area determined as a result of the matching is lower than a third threshold value.

In the case where the expected score is not obtained even by performing the second matching, it is determined whether the tracking is continued or ended. At this point, the determination may be performed based on the intensity of the edge in the area determined by matching (i.e., the area in which the target object to be tracked is presumed to be present). The intensity of the edge in the area is the sum of the edge intensities of pixels included in the area.

For example, in the case where the intensity of the edge in the area determined by matching is not more than the predetermined threshold value, it is highly possible that the background is present in the area instead of a currently tracked object, and hence the tracking is ended. Thus, by using the intensity of the edge in combination, it becomes possible to appropriately determine whether or not the tracking is ended.

Also, the tracking unit may acquire for a predetermined number of consecutive images a sum of scores of results of the first matching or scores of results of the second matching, and may determine whether or not the tracking of the target object to be tracked is ended, based on the sum.

In the case where matching is performed on a plurality of consecutive images and the target object to be tracked is tracked, it is possible to determine whether the tracking is continued or ended based on the scores obtained by the matching. However, in the case where the determination is performed by using only the result of matching of a single image, even when the score is temporarily reduced and recovers from the reduction thereafter, the tracking is canceled. To cope with this, the sores obtained by performing the matching on the plurality of consecutive images are added up, and the determination is performed based on the sum. According to the configuration described above, it is possible to end the tracking only in the case where the recovery of the score is not possible.

Also, in a case where the result of the detection of the target object to be tracked in an image prior to a target image to be processed is present, the tracking unit may acquire the first template, based on the result.

In the case where the position of the target object to be tracked is determined, the first template may be acquired by using the information on the position thereof. According to the configuration described above, it becomes possible to track the target object to be tracked while updating the template, and hence the configuration is effective in the case where the sight of the target object to be tracked gradually changes.

Also, the tracking unit may divide an area corresponding to the target object to be tracked into a plurality of blocks, and may use, as the first template, an area obtained by excluding the block in which the intensity of the edge is lower than a fourth threshold value.

There are cases where the orientation of the target object to be tracked changes on the image and the sight thereof gradually becomes smaller.

In such cases, when processing is performed while the template is updated for each frame, it is necessary to gradually reduce the area serving as the template. To cope with this, a partial area in which the target object to be tracked is not present may be detected based on the intensity of the edge from an area in which the target object to be tracked is presumed to be present, and the area from which the partial area is deleted may be used as the template used in the next frame.

According to the configuration described above, it is possible to appropriately change the size of the template in accordance with the size of the target object to be tracked on the image.

Also, the target object to be tracked may be a vehicle, and the plurality of blocks may be horizontally arranged. This is because, in the case where the vehicle is tracked, a horizontal size on the image changes mainly due to the right or left turn of the vehicle.

Note that the present invention can be viewed as an image processing apparatus that includes at least part of the above units. In addition, the present invention can also be viewed as an image processing method executed by the above image processing apparatus. Further, the present invention can also be viewed as a program that causes a computer to execute the above image processing method. The above processes and units can be arbitrarily combined and implemented as long as no technical conflicts occur.

Advantageous Effects of Invention

According to the present invention, in the image processing apparatus for tracking the object, it is possible to improve accuracy in tracking in the case where the sight of the target object to be tracked changes.

DESCRIPTION OF EMBODIMENTS (System Configuration)

Hereinbelow, a preferred embodiment of the present invention will be described with reference to the drawings.

An image processing system according to the present embodiment is a system that consecutively acquires images of a vehicle traveling on a road, and tracks the movement of the vehicle based on a plurality of the acquired images.

Figure 1:
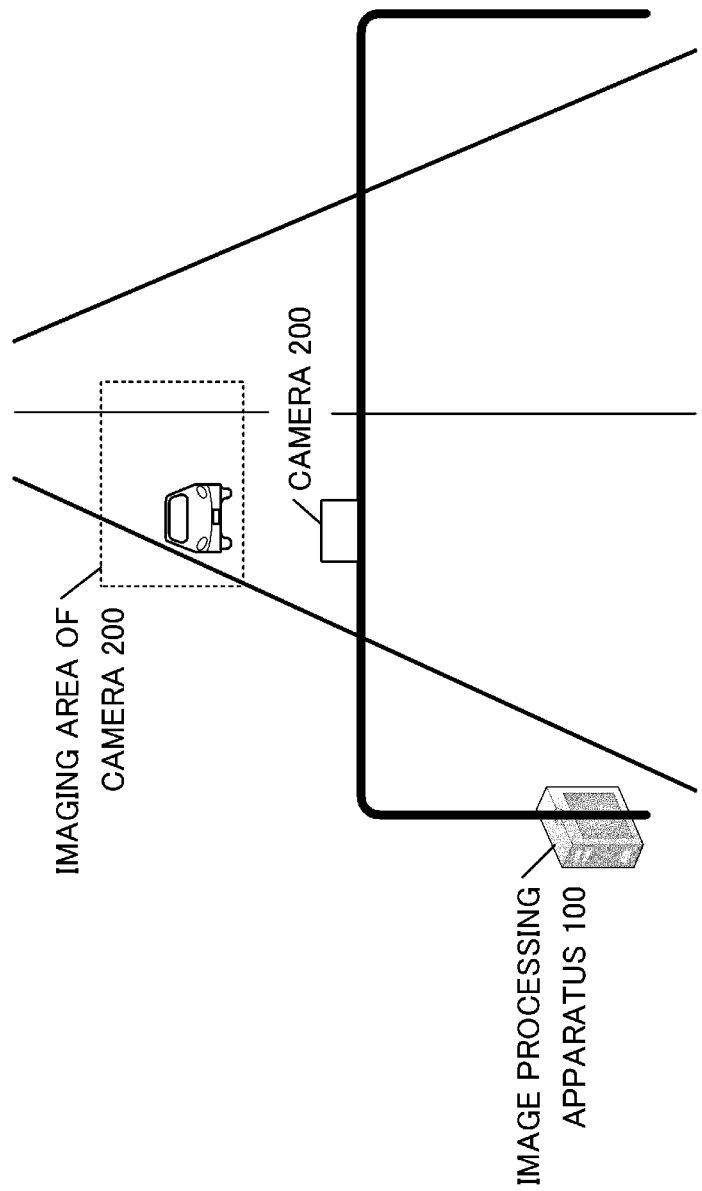
FIG. 1 is a layout of an image processing system according to an embodiment.

FIG. 1 is a layout of the image processing system according to the present embodiment. The image processing system according to the present embodiment includes an image processing apparatus 100 and a camera 200, and the image processing apparatus 100 processes a plurality of images consecutively captured by the camera 200 disposed on a road to track the movement of a vehicle.

Figure 2:
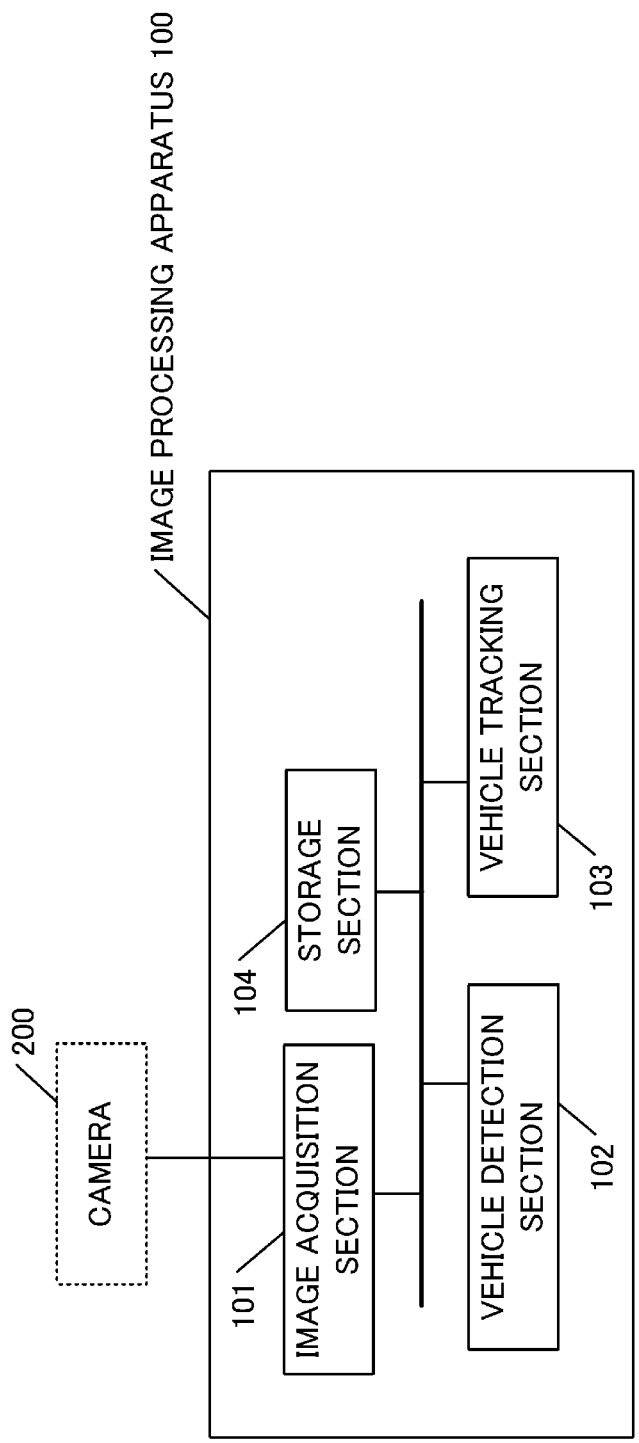
FIG. 2 is a configuration diagram of the image processing system according to the embodiment.

FIG. 2 is a system configuration diagram of the image processing system according to the present embodiment.

The image processing apparatus 100 includes an image acquisition section 101, a vehicle detection section 102, a vehicle tracking section 103, and a storage section 104.

The image acquisition section 101 is a unit configured to acquire an image (hereinafter referred to as a road image) that includes a vehicle traveling on a road by using the camera 200 mounted on the road. The image acquisition section 101 can acquire the road images consecutively at a predetermined frame rate. The road images acquired by the image acquisition section 101 are stored in the storage section 104 chronologically, and are used in processes performed by the individual units described later.

Note that, in the description of the embodiment, the term "frame" is used to mean one of the road images that are consecutively acquired, but the frame is equivalent to the road image. In addition, in consecutive frames, the appearance of a new vehicle (a vehicle that is not yet tracked) from outside an imaging area is referred to as flowing in, and the movement of a vehicle that is being tracked out of the imaging area is referred to as flowing out.

The vehicle detection section 102 is a unit configured to detect that a new vehicle that is not currently tracked flows in the imaging area of the camera 200. The detection of the new vehicle can be performed by using a plurality of templates that are pre-stored in the storage section 104. The template may be any template that allows the detection of the vehicle. For example, the template may differ according to a vehicle type or a vehicle shape (a passenger car, a truck, a bus, and a motorcycle). In addition, in the case where a plurality of templates are used, the templates may be classified arbitrarily. Further, the template in the case where the vehicle is viewed in a different direction (the front, rear, left, or right) may be retained for each direction.

The vehicle detection section 102 is a unit configured to detect the appearance of the new vehicle that is not tracked, and tracking of the vehicle in subsequent frames is performed by the vehicle tracking section 103.

Note that, in the present embodiment, it is assumed that the vehicle is tracked in the entire imaging area of the camera 200, but the area in which the vehicle is tracked may be determined separately.

The vehicle tracking section 103 is a unit configured to track the movement of the vehicle detected by the vehicle detection section 102 between a plurality of the frames. The tracking is continued until the vehicle flows out of the imaging area. The tracking of the vehicle is performed by using the template corresponding to the target vehicle to be tracked (hereinafter referred to as a tracking target vehicle). Specifically, a target area that is searched by matching (hereinafter referred to as a search area) is set in each frame, and matching that uses the template is performed on the area. Note that the template may be a feature amount, but it is assumed that the template is a template image in the present embodiment.

The search area is the area that is searched for the vehicle, and the search area is set at a location where the tracking target vehicle is presumed to be present. For example, in the case where the result of detection of the vehicle in the previous frame is present, the vehicle tracking section 103 sets the search area based on the result.

The specific details of a matching process that uses the template will be described later.

The storage section 104 is a unit configured to temporarily or permanently store data that is used by the apparatus. As the storage section 104, it is preferable to use a storage medium that is capable of high-speed read and write and has a large capacity. For example, a flash memory or the like can be suitably used. The storage section 104 temporarily or permanently stores the template used by the vehicle detection section 102 and the vehicle tracking section 103, and a plurality of images acquired by the image acquisition section 101.

Note that the image acquisition section 101, the vehicle detection section 102, and the vehicle tracking section 103 may be implemented by exclusively designed hardware, or may also be implemented by a software module. In the case where they are executed as software, a program stored in an auxiliary storage apparatus is loaded into a main storage apparatus and the program is executed by a CPU, and each unit thereby functions (the CPU, the auxiliary storage apparatus, and the main storage apparatus are not shown).

The camera 200 is a monitoring camera disposed on a road. In the present embodiment, the camera 200 is not a camera that is used only for the tracking of the vehicle but a shared camera that is use for the other purposes such as monitoring. Consequently, there are cases where pan, tilt, or zoom is performed irrespective of the tracking of the vehicle.

(Problem in Conventional Art)

Figure 3A:
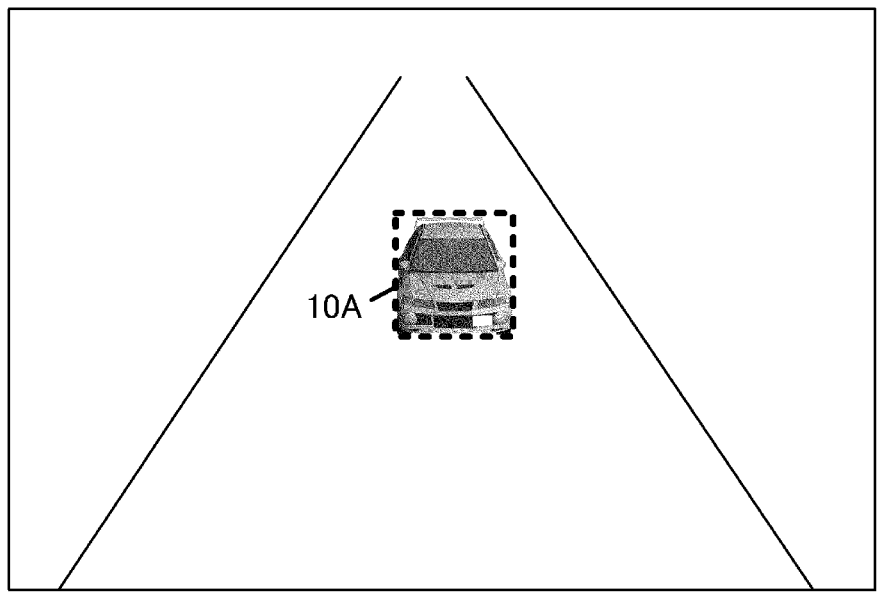
FIGS. 3A and 3B are views for explaining an effect in the case where a camera is zoomed.
Figure 3B:
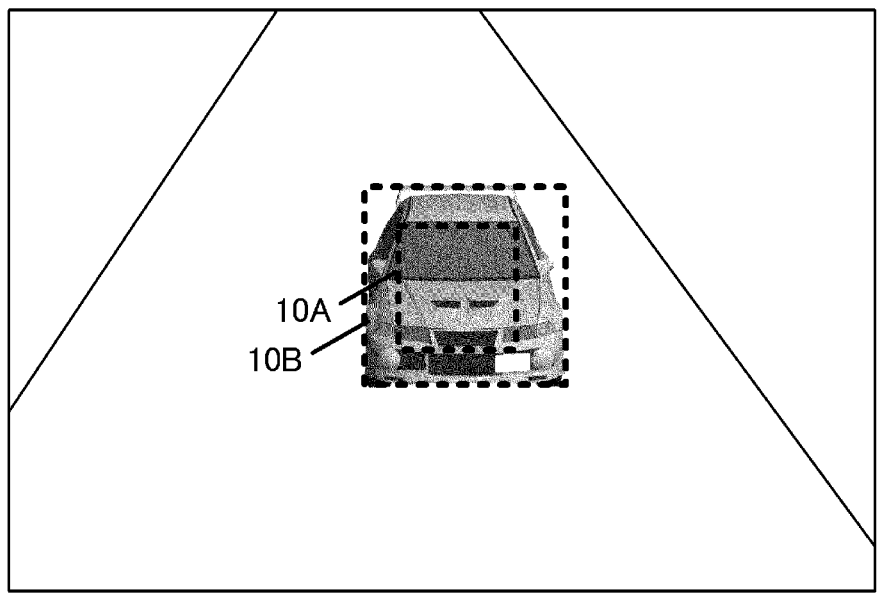

Next, a matching target area and a problem that occurs in a conventional art will be described. FIGS. 3A and 3B are views showing images captured by the camera 200.

The image processing apparatus according to the present embodiment acquires the template corresponding to the tracking target vehicle, and then performs pattern matching on the image acquired by the camera 200 to detect the position of the tracking target vehicle.

For example, consideration is given to the case where, as a result of pattern matching performed on the image captured by the camera 200 by using a plurality of the templates corresponding to different vehicle types, the vehicle is detected in an area indicated by a reference numeral 10A in FIG. 3A.

In the case where such a method is used, when the size or orientation of the vehicle on the image changes, there are cases where the tracking results in failure. FIG. 3B is a view showing a state in which the camera 200 is zoomed and the angle of view is narrowed. In such a case, when the template used in FIG. 3A is continuously used, a problem arises in that matching results in failure or a matching score is significantly reduced. In order to solve the problem, it is necessary to change the size of the template in accordance with the change of the sight of the vehicle (in this example, the size is increased to a size indicated by a reference numeral 10B).

Figure 4A:
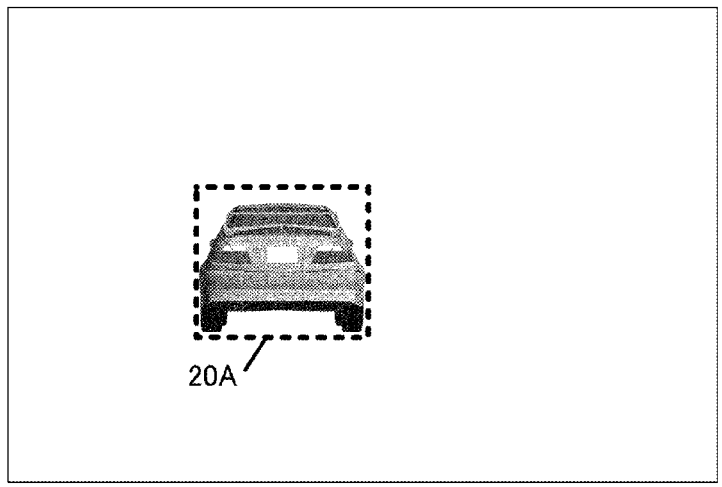
FIGS. 4A to 4C are views for explaining an effect in the case where a vehicle turns right.
Figure 4B:
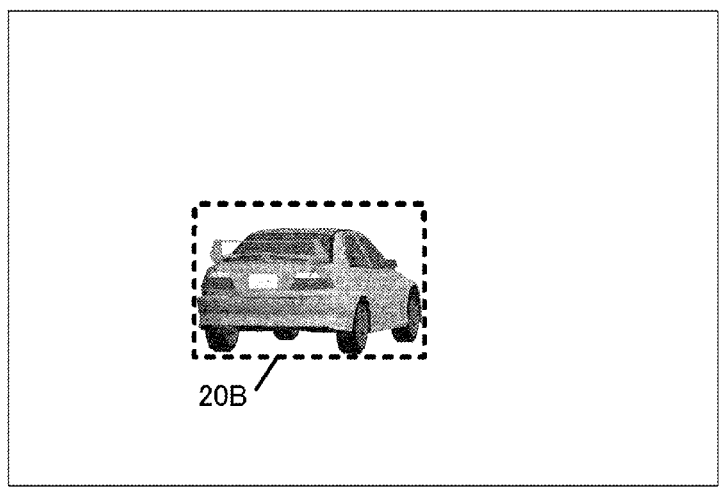
Figure 4C:
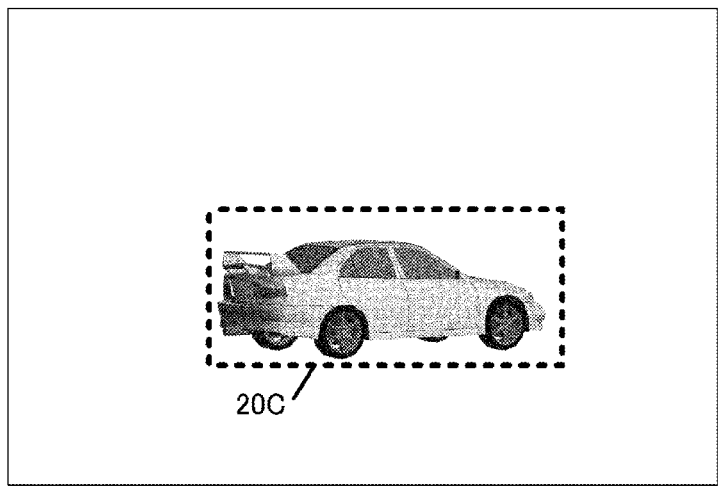

Another example will be described. FIGS. 4A to 4C are views showing an example in the case where the vehicle turns right. As shown in the example, in the case where the traveling direction of the vehicle changes, the size of the vehicle on the image changes, and hence it is necessary to deform the template in accordance with the change of the size (in the present example, the template is enlarged gradually, as indicated by reference numerals 20A, 20B, and 20C). In addition, in the example in FIGS. 4A to 4C, the sight of the vehicle itself changes, and hence it is necessary to update not only the size of the template but also the content of the template in accordance with the traveling direction of the vehicle.

In the tracking of the vehicle, the image processing apparatus according to the present embodiment detects the change of the size or the orientation of the vehicle on the image, and updates the template in the next frame by using an appropriate size. With this, even in the case where the sight of the vehicle on the image changes, it is possible to perform appropriate pattern matching on the vehicle, and track the vehicle accurately. A specific method for updating the template will be described later.

(Process Flowchart)

Figure 5:
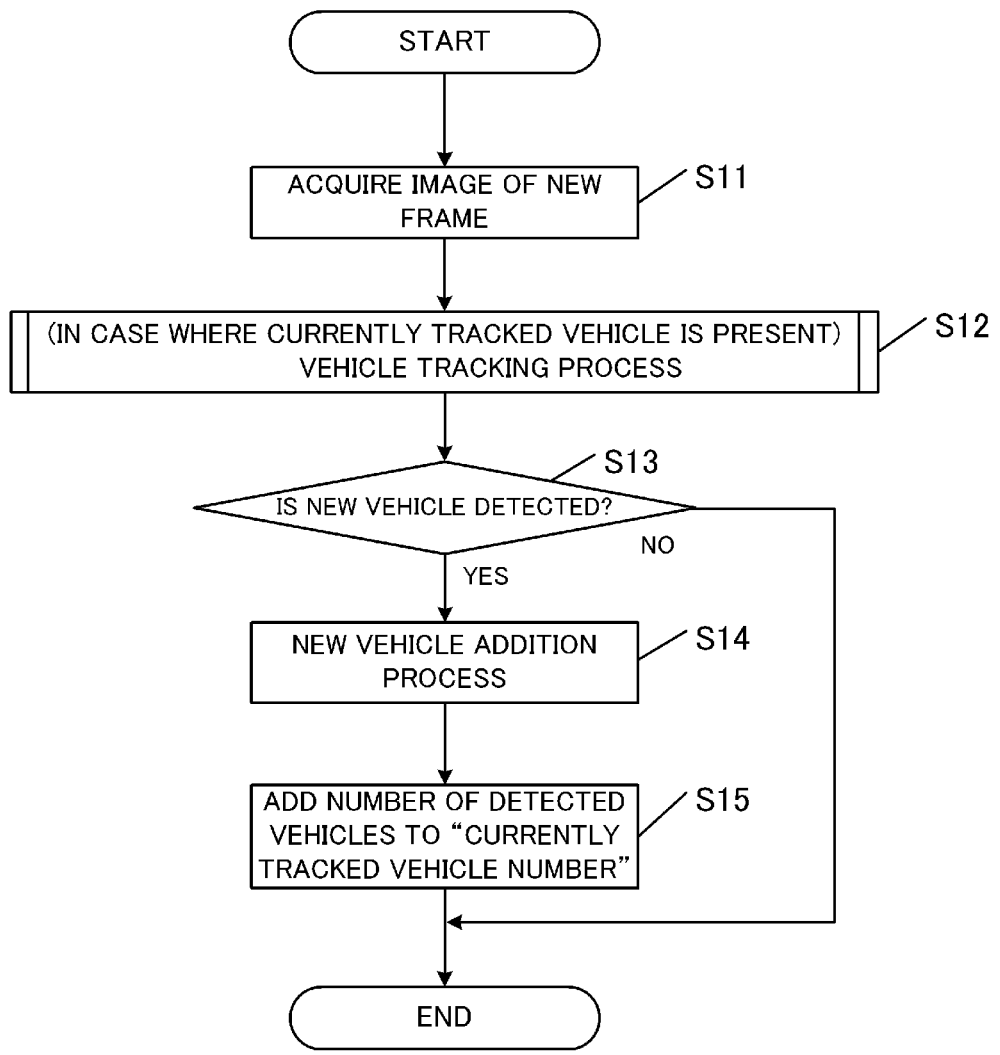
FIG. 5 is a flowchart of processing performed by an image processing apparatus according to the embodiment.

Next, the details of image processing performed by the image processing apparatus 100 will be described with reference to FIG. 5 serving as a process flowchart. Processing shown in FIG. 5 is executed every time the image acquisition section 101 acquires a new frame. For example, in the case where the frame rate is 10 fps, the processing is executed 10 times per second.

First, in Step S11, the image acquisition section 101 acquires the road image via the camera 200, and causes the storage section 104 to store the road image temporarily. Note that the acquired road image is stored chronologically, and is deleted when the processing is completed.

Next, in Step S12, the vehicle tracking section 13 determines whether or not a currently tracked vehicle is present and, in the case where the currently tracked vehicle is present, the vehicle tracking section 13 executes a process for tracking the tracking target vehicle. It is determined whether or not the currently tracked vehicle is present by using a counter described later. Note that the description will be made on the assumption that the currently tracked vehicle is not present, and the details of Step S12 will be described later with reference to FIG. 6.

In Step S13, the vehicle detection section 102 determines whether or not the vehicle that is not currently tracked is present on the image acquired in Step S11. Specifically, the vehicle detection section 102 performs the detection of the vehicle based on the template pre-stored in the storage section 104. In the detection of the vehicle in the present step, it is possible to use a known object detection method based on the template. For example, matching is performed by using a plurality of stored templates, and an initial position and an area are determined. Note that, in the case where the detected vehicle is a currently tracked vehicle, the vehicle is skipped. Information on the currently tracked vehicle is shared by the vehicle detection section 102 and the vehicle tracking section 103 via the storage section 104.

When a new vehicle is detected, the processing transitions to Step S14. In the case where the new vehicle is not detected, the processing performed on the frame is ended.

When the vehicle is detected, the vehicle detection section 102 causes the storage section 104 to store a detected area in Step S14. With this, the detected vehicle is brought into a currently tracked state.

Next, in Step S15, the vehicle detection section 102 adds the number of detected vehicles to the number of currently tracked vehicles (hereinafter referred to as a currently tracked vehicle number). The number of vehicles set herein is used in a vehicle tracking process executed in Step S12.

Figure 6:
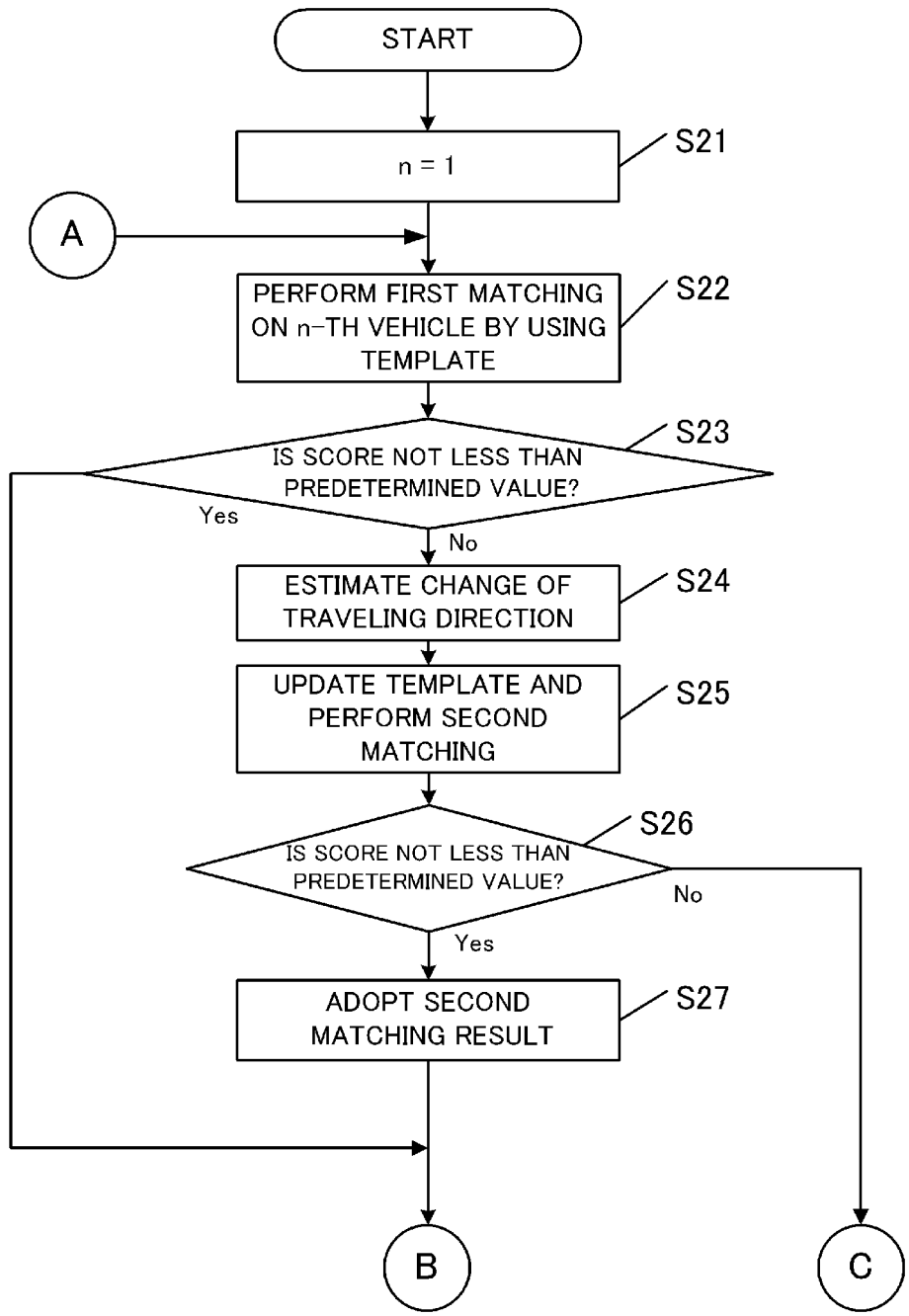
FIG. 6 is a flowchart of the processing performed by the image processing apparatus according to the embodiment.

Next, the process executed in Step S12 will be described with reference to a flowchart shown in FIG. 6. Note that it is assumed that each step is executed by the vehicle tracking section 103 unless otherwise specified.

The process in Step S12 is executed in the case where the set "currently tracked vehicle number" is not less than one. That is, at a timing when Step S12 is executed, two or more frames are chronologically stored in the storage section 104.

First, in Step S21, a counter n is set to 1. n is the counter for sequentially performing the process on the tracking target vehicles included in the image.

Next, in Step S22, pattern matching is performed on the road image by using the template corresponding to the n-th vehicle. The template used herein may be, e.g., the template used for the detection of the vehicle in Step S13.

In the present step, the rough position of the n-th vehicle included in the image in the current frame is estimated, and the search area is set. For example, in the case where the change of the position of the n-th vehicle is determined in two or more previous frames, the position in the current frame may be estimated based on the change of the position. For example, the change of the position of the target vehicle from the position thereof in the second previous frame to the position thereof in the previous frame may be acquired, and the position of the target vehicle in the current frame may be estimated by using the change. In addition, the position of the vehicle may also be estimated by using a Kalman filter or the like.

Note that, in the case where sufficient information for performing the estimation is not provided, it may be presumed that the target vehicle is positioned in the vicinity of the position detected in Step S13, or narrowing may be omitted.

Subsequently, first matching is performed by using the corresponding template.

In Step S23, the matching score in the first matching is acquired, and it is determined whether or not the matching score is not less than a predetermined value (first threshold value). As a result, when the matching score is less than the predetermined value, this means that the currently used template does not allow accurate tracking of the tracking target vehicle, and hence, in subsequent steps, the template is deformed and matching is performed again.

In Step S24, the change of the traveling direction of the tracking target vehicle is estimated. The change of the traveling direction may be estimated based on a previous tracking result. For example, in the case where a history of significant change of the position of the vehicle in the vicinity of the currently set search area is present, it can be presumed that the position of the vehicle has changed continuously. The traveling direction may also be estimated based on the shape of the road of which the video is shot by the camera 200. For example, in the case where the road of which the video is shot is a crossroads or a T-shaped intersection, it may be presumed that the vehicle travels in one of directions. In this case, there may be a plurality of presumption results.

Note that the process in Step S24 may be omitted.

In Step S25, the template used in Step S22 is updated, and pattern matching (second matching) is performed again.

As an update method of the template, the following methods are available.

(1) Used Template is Simply Enlarged/Reduced

This method is effective in the case where the camera is zoomed in (or zoomed out), or the tracking target vehicle travels in a screen near-side direction (or a screen far-side direction) (see FIGS. 3A and 3B).

(2) Template is Replaced with Template Corresponding to Traveling Direction of Vehicle This method is effective in the case where the vehicle traveling in the screen near-side direction (or the screen far-side direction) turns right or left, or the case where the vehicle having come out from a side road turns right or left, and travels in the screen near-side direction (or the screen far-side direction) (see FIGS. 4A to 4C). In these cases, the template to be used is updated based on the change of the traveling direction estimated in Step S24. For example, in the case where it is determined that the vehicle having faced the front is directed in a left oblique direction in Step S24, matching is performed by using the template corresponding to a left oblique near-side direction. Note that the replaced template may also be resized into an appropriate size (e.g., a size based on the template that has been used immediately previously).

In Step S26, the matching score in the second matching is acquired, and it is determined whether or not the matching score is not less than a predetermined value (second threshold value). As a result, when the matching score is not less than the predetermined value (Step S26—Yes), this means that the tracking target vehicle is detected accurately, and hence the result of the second matching is adopted as the tracking result (Step S27).

On the other hand, in the case where the matching score is less than the predetermined value in Step S26 (Step S26—No), there is a possibility that the tracking target vehicle is lost, and hence, in subsequent steps, it is determined whether or not the tracking is further continued or ended.

Figure 7:
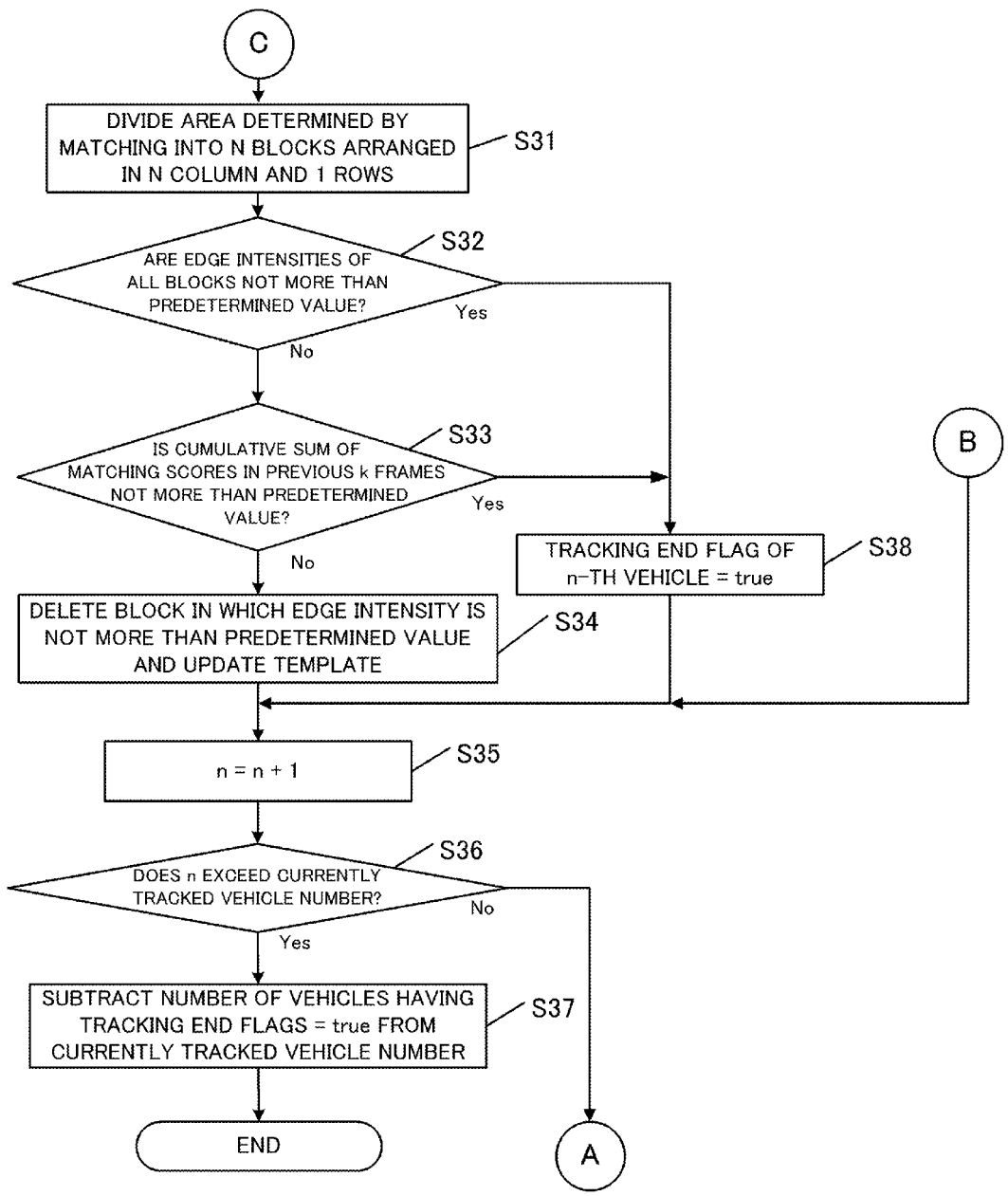
FIG. 7 is a flowchart of the processing performed by the image processing apparatus according to the embodiment.

The description will be continued with reference to FIG. 7.

Figure 8:
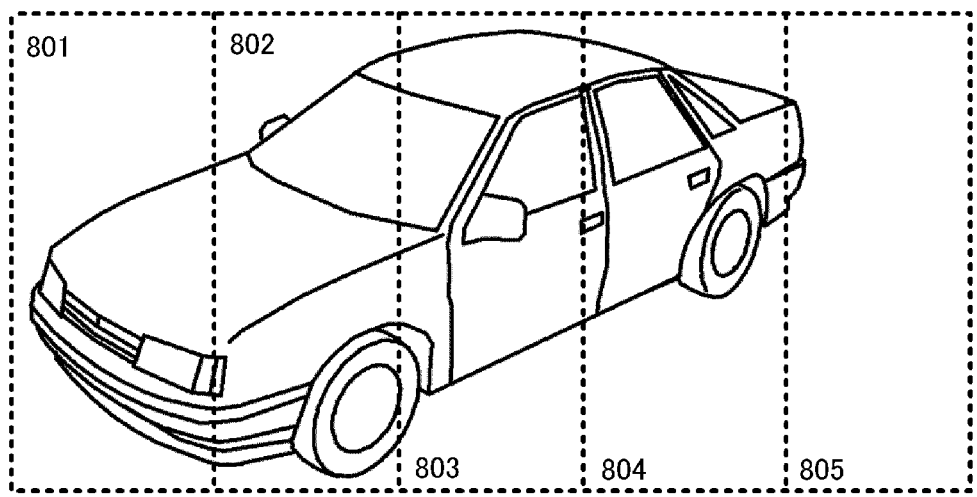
FIG. 8 is a view for explaining a process performed in Step S34.

In Step S31, the area determined by matching (i.e., the area in which the tracking target vehicle is presumed to be present) is divided into N blocks arranged in N column and 1 rows. FIG. 8 is a view showing an example of the division. In the present example, as shown in FIG. 8, the area determined by matching is divided into 5 blocks arranged in 5 column and 1 rows.

Next, in Step S32, it is determined whether or not edge intensities of all blocks are not more than a predetermined value. The edge intensity of the block is the sum of the edge intensities of pixels included in the block. For example, a Sobel filter that extracts the edge present in a specific direction is applied to the acquired image, and the sum of absolute values of all obtained values is acquired. The acquired edge intensity may be the edge intensity in a longitudinal direction or a lateral direction. In addition, the edge intensities in both directions may be combined. With this, the edge intensity of each block is obtained.

As a result, in the case where the edge intensities of all blocks are not more than the predetermined value, it is presumed that the vehicle is not present in any of the blocks, and hence a tracking end flag of the n-th vehicle is set to true (Step S38). This is because a strong edge is seen in the block in which the vehicle is present as compared with the block in which the vehicle is absent (e.g., the block in which only the road is present).

In the case where there is any block in which the edge intensity is not less than the predetermined value, the process transitions to Step S33.

In Step S33, the sum of the matching scores for the n-th vehicle in previous k frames (k is any integer) is calculated, and it is determined whether the sum is not more than a predetermined value. The matching scores used in the calculation may be scores corresponding to the first matching or the second matching. In the case where the sum is not more than the predetermined value, it is presumed that the matching score is permanently low, and hence the tracking end flag of the n-th vehicle is set to true (Step S38).

In the case where the sum is more than the predetermined value, the process transitions to Step S34.

In Step S34, among the blocks obtained by the division in Step S32, the block in which the edge intensity is not more than the predetermined value is deleted. The present step is the step of estimating the change of the traveling direction of the vehicle based on the edge intensity and determining the area in which the vehicle is present. For example, in the case of an example of FIG. 8, the edge intensity of an area 805 is not more than the predetermined value, and hence it is determined that the vehicle is not present in the area 805. Subsequently, an image corresponding to areas 801 to 804 is cut out, and is used as a new template. The acquired template is used in matching in the next and subsequent frames.

Figure 9A:
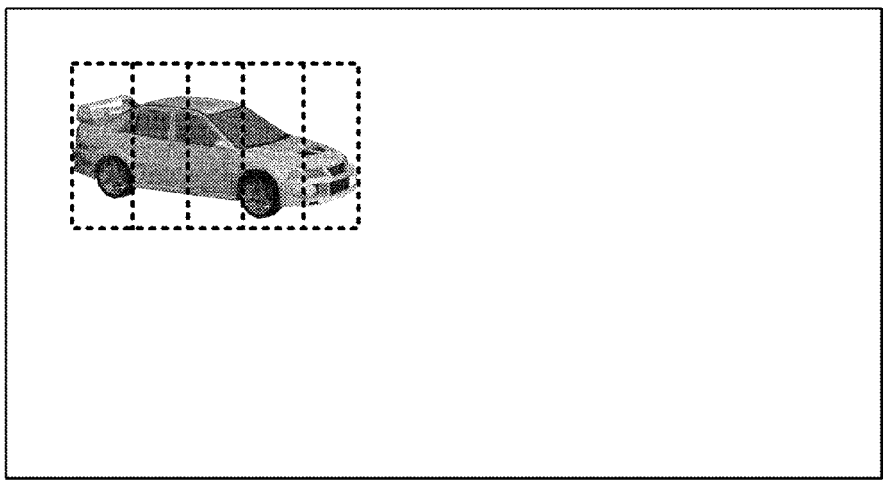
FIGS. 9A to 9C are views for explaining the process performed in Step S34.
Figure 9B:
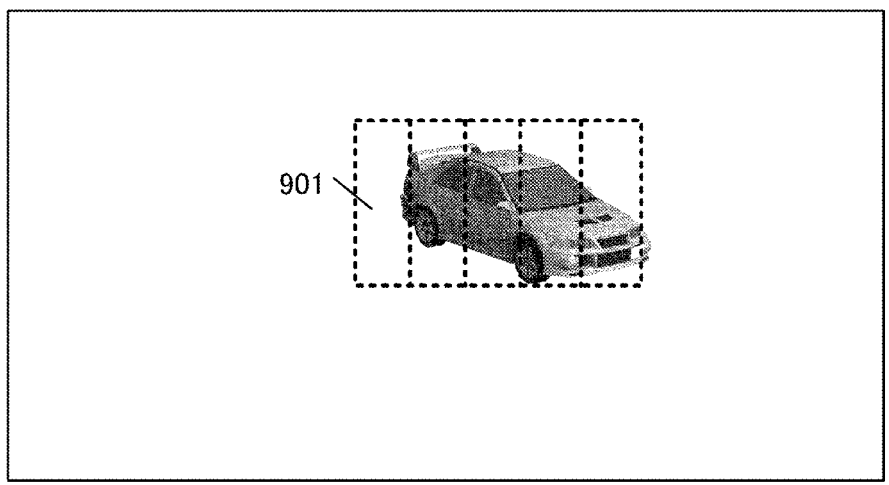
Figure 9C:
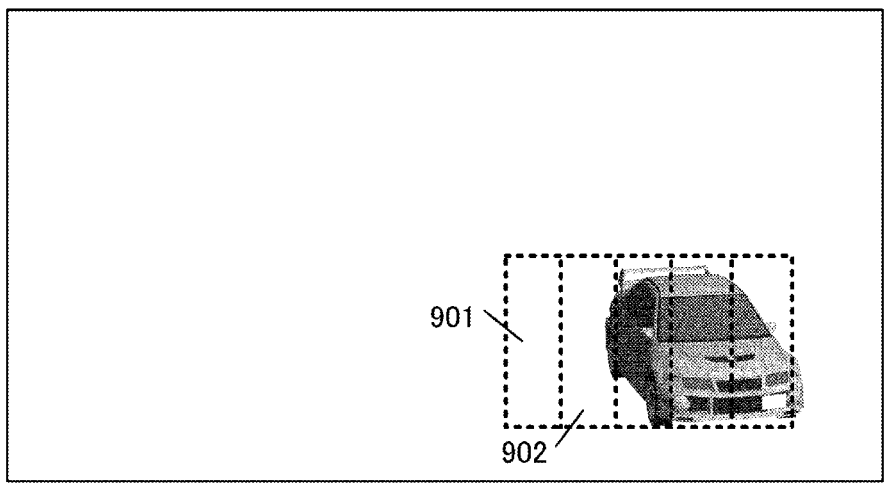

A specific example will be described with reference to FIGS. 9A to 9C. FIGS. 9A to 9C show an example in the case where the vehicle having come out from a side road turns right, and travels in the image near-side direction.

When the process is performed by the above-described method, areas indicated by reference numerals 901 and 902 are deleted, and an image corresponding to the remaining areas serves as a new template.

With this, the tracking process performed on the n-th vehicle is ended.

The process transitions to Step S35 after the end of the process in Step S34, in the case where the determination in Step S23 is affirmative, after the end of the process in Step S27, or after the end of the process in Step S38.

The counter n is incremented in Step S35, and it is determined whether or not the counter n exceeds the currently tracked vehicle number in Step S36. As a result, in the case where the counter n does not exceed the currently tracked vehicle number, the process returns to Step S22, and the tracking of the next vehicle is started. In the case where the counter n exceeds the currently tracked vehicle number, the number of vehicles of which the tracking is ended (the number of vehicles of which the tracking end flags are set to true) is subtracted from the currently tracked vehicle number.

Note that the updated template is used in the process in the next frame.

In the present example, the process returns to Step S22. However, the process may return to Step S24 or S25, and the process may be performed from the second matching.

Thus, in the image processing apparatus according to the present embodiment, in the case where the adequate score is not obtained as the result of the pattern matching that uses the first template, the change of the sight of the vehicle is predicted and the template is updated accordingly, and the pattern matching is performed again. With this, even in the case where the sight of the vehicle on the image sharply changes, it is possible to cope with the sharp change.

In addition, it is determined whether the tracking is ended or continued by analyzing the area in which the tracking target vehicle is presumed to be present. With this, it is possible to prevent an object other than the vehicle from being erroneously recognized as the vehicle, and prevent continuation of the tracking of the object.

That is, it is possible to improve accuracy in the tracking of the vehicle.

(Modification)

In the above-described embodiment, in the case where a predetermined score is not obtained in Step S23 (or matching results in failure), the template is updated after the change of the traveling direction of the tracking target vehicle is estimated, and matching is performed again. However, a process other than the above process may be performed.

For example, in the case where, although the score is not high, the matching is successful, it may be determined that the sight of the tracking target vehicle gradually changes, and the template used in the next and subsequent frames may be updated to the template corresponding to the sight thereof after the change after the result of the first matching is adopted.

Note that, in order to acquire the template corresponding to the sight thereof after the change, the process for estimating the change of the traveling direction described in Step S24 may be used in combination.

Note that the above-described embodiment and the present modification may be used in combination. For example, a plurality of threshold values may be set in Step S23, and the process to be executed may be determined according to the obtained score. For example, in Step S23, the scores may be classified into three levels using a threshold value A and a threshold value B (A>B is assumed to be satisfied), the process described in the present modification may be performed in the case where the score is less than the threshold value A and not less than the threshold value B, and the processes in Steps S24 to S27 may be performed in the case where the score is less than the threshold value B.

(Other Modifications)

The above embodiment is only exemplary, and the present invention can be appropriately modified and implemented without departing from the gist thereof.

For example, even when part of Steps S31 to S34 is omitted, it is possible to obtain the effects of the present invention.

In addition, in the description of the embodiment, matching is performed by using the template image, but the matching may be performed by using the feature amount. Further, in the case where the template image is used, the matching may be performed by using one template image, or the template image may be divided into a plurality of blocks and the matching may be performed on each of the blocks. For example, an average in a plurality of the blocks may be determined, or the average may also be determined after outliers are deleted.

Further, in the description of the embodiment, the updated template is acquired in Step S25 but, in the case where a plurality of patterns of the change of the sight on the image are conceivable (e.g., in the case where the vehicle can travel straight, turn left, and turn right in three directions), a plurality of templates may be acquired, and the matching may be performed by using each of the templates. In this case, when a predetermined score is not obtained in any of the results, the determination in Step S26 may be negative.

In addition, the object that is tracked by the image processing apparatus according to the present invention is not limited to the vehicle.

REFERENCE SIGNS

100 Image processing apparatus
101 Image acquisition section
102 Vehicle detection section
103 Vehicle tracking section
104 Storage section
200 Camera

The invention claimed is:

1. An image processing apparatus for tracking a target object to be tracked included in a plurality of consecutively captured images,
    the image processing apparatus comprising a processor configured with a program to perform operations comprising:
    operation as an image acquisition unit configured to acquire an image; and
    operation as a tracking unit configured to detect a target object to be tracked included in the image by matching and acquire over a plurality of the images an amount of movement of the target object to be tracked and a direction of the movement of the target object to be tracked,
    wherein the processor is configured with the program such that operation as the tracking unit comprises operation as the tracking unit that performs first matching by using a first template corresponding to the target object to be tracked, and performs second matching by using a second template, which is different in size or shape from the first template, in a case in which a score of a result of the first matching is lower than a first threshold value, and determines whether tracking of the target object to be tracked is ended based on both of a score of a result of the second matching and an intensity of an edge in an area that is determined as a result of the matching.

2. The image processing apparatus according to claim 1, wherein
    the processor is configured with the program such that operation as the tracking unit comprises operation as the tracking unit that estimates a change of a traveling direction of the target object to be tracked, based on a result of the detection of the target object to be tracked, and performs the second matching by using the second template corresponding to the traveling direction after the change.

3. The image processing apparatus according to claim 1, wherein the processor is configured with the program such that operation as the tracking unit comprises operation as the tracking unit that ends the tracking of the target object to be tracked in a case in which the score of the result of the second matching is lower than a second threshold value and the intensity of the edge in the area determined as a result of the matching is lower than a third threshold value.

4. The image processing apparatus according to claim 1, wherein the processor is configured with the program such that operation as the tracking unit comprises operation as the tracking unit that acquires for a predetermined number of consecutive images a sum of scores of results of the first matching or scores of results of the second matching, and determines whether the tracking of the target object to be tracked is ended, based on the sum.

5. The image processing apparatus according to claim 1, wherein, the processor is configured with the program such that in a case in which the result of the detection of the target object to be tracked in an image prior to a target image to be processed is present, operation as the tracking unit comprises operation as the tracking unit that acquires the first template, based on the result.

6. The image processing apparatus according to claim 5, wherein the processor is conjured with the program such that operation as the tracking unit comprises operation as the tracking unit that divides an area corresponding to the target object to be tracked into a plurality of blocks, and uses, as the first template, an area obtained by excluding the block in which the intensity of the edge is lower than a fourth threshold value.

7. The image processing apparatus according to claim 6, wherein the target object to be tracked is a vehicle, and the plurality of blocks are horizontally arranged.

8. An image processing method performed by an image processing apparatus for tracking a target object to be tracked included in a plurality of consecutively captured images, the image processing method comprising:

an image acquisition step of acquiring an image; and a tracking step of detecting a target object to be tracked included in the image by matching and acquiring over a plurality of the images an amount of movement of the target object to be tracked and a direction of the movement of the target object to be tracked, wherein in the tracking step, first matching is performed by using a first template corresponding to the target object to be tracked, and second matching is performed by using a second template, which is different in size or shape from the first template, in a case in which a score of a result of the first matching is lower than a first threshold value, and whether tracking of the target object to be tracked is ended is determined based on both of a score of a result of the second matching and an intensity of an edge in an area that is determined as a result of the matching.

9. A non-transitory computer readable storage medium storing a computer program for causing a computer to perform the image processing method according to claim 8.

10. An image processing apparatus for tracking a target object to be tracked included in a plurality of consecutively captured images, the image processing apparatus comprising a processor configured with a program to perform operations comprising:

operation as an image acquisition unit configured to acquire an image; and operation as a tracking unit configured to detect a target object to be tracked included in the image by matching and acquire over a plurality of the images an amount of movement of the target object to be tracked and a direction of the movement of the target object to be tracked, wherein the processor is configured with the program such that operation as the tracking unit comprises operation as the tracking unit that performs first matching by using a first template corresponding to the target object to be tracked, and performs second matching by using a second template, which is different in size or shape from the first template, in a case in which a score of a result of the first matching is lower than a first threshold value, and in a case in which the result of the detection of the target object to be tracked in an image prior to a target image to be processed is present, the tracking unit acquires the first template, based on the result.

11. An image processing method performed by an image processing apparatus for tracking a target object to be tracked included in a plurality of consecutively captured images, the image processing method comprising:

an image acquisition step of acquiring an image; and a tracking step of detecting a target object to be tracked included in the image by matching and acquiring over a plurality of the images an amount of movement of the target object to be tracked and a direction of the movement of the target object to be tracked, wherein in the tracking step, first matching is performed by using a first template corresponding to the target object to be tracked, and second matching is performed by using a second template, which is different in size or shape from the first template, in a case in which a score of a result of the first matching is lower than a first threshold value, and in a case in which the result of the detection of the target object to be tracked in an image prior to a target image to be processed is present, the first template is acquired, based on the result.

* * * * *